US011199175B1

(12) United States Patent
Landa et al.

(10) Patent No.: US 11,199,175 B1
(45) Date of Patent: Dec. 14, 2021

(54) METHOD AND SYSTEM FOR DETERMINING AND TRACKING THE TOP PIVOT POINT OF A WIND TURBINE TOWER

(71) Applicant: General Electric Company, Schenectady, NY (US)

(72) Inventors: Bernard P. Landa, Clifton Park, NY (US); Pierino Gianni Bonanni, Loudonville, NY (US); Xu Fu, Clifton Park, NY (US); Samuel Bryan Shartzer, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/092,706

(22) Filed: Nov. 9, 2020

(51) Int. Cl.
*F03D 80/50* (2016.01)
*F03D 13/20* (2016.01)
*H04L 9/08* (2006.01)
*G01M 99/00* (2011.01)
(Continued)

(52) U.S. Cl.
CPC ............. *F03D 13/20* (2016.05); *F03D 80/50* (2016.05); *G01M 99/004* (2013.01); *H04L 9/0872* (2013.01); *F03D 9/25* (2016.05); *F03D 80/70* (2016.05); *F05B 2240/912* (2013.01); *F05B 2260/821* (2013.01); *F05B 2270/32* (2013.01); *F05B 2270/331* (2013.01)

(58) Field of Classification Search
CPC .... G01M 99/004; H04L 9/0872; F03D 80/50; F05B 2260/821; F05B 2240/912; F05B 2270/32; F05B 2270/331

USPC .......................................... 416/1; 290/44, 55
See application file for complete search history.

(56) References Cited

U.S. PATENT DOCUMENTS

| 4,172,551 A | 10/1979 | Johnson |
| 4,182,456 A | 1/1980 | Paul |
| 4,263,099 A | 4/1981 | Porter |

(Continued)

FOREIGN PATENT DOCUMENTS

| CA | 3007275 A1 | 6/2017 |
| CN | 103147917 A | 6/2013 |

(Continued)

OTHER PUBLICATIONS

C94-M8P, u-blox, u-blox RTK Application Board Package https://www.u-blox.com/en/product/c94-m8p.

(Continued)

*Primary Examiner* — Charles Reid, Jr.
(74) *Attorney, Agent, or Firm* — Dority & Manning, P.A.

(57) ABSTRACT

A system and method are provided for determining a geographic location of a tower top pivot point (TPP) of a wind turbine tower having a nacelle that includes a machine head and rotor at a top thereof. At least one rover receiver of a global navigation satellite system (GNSS) is configured at a fixed position on the nacelle. A plurality of 360-degree yaw sweeps of the nacelle are conducted and the geo-location signals received by the rover receiver during the yaw sweeps are recorded. With a controller, the geo-location signals are converted into a circular plot and a radius of the plot is determined, the radius being a distance between the rover receiver and the TPP. Based on a GNSS geo-location of the rover receiver and the radius, a geo-location of the TPP is computed.

20 Claims, 5 Drawing Sheets

(51) Int. Cl.
*F03D 9/25* (2016.01)
*F03D 80/70* (2016.01)

(56) References Cited

U.S. PATENT DOCUMENTS

| | | | |
|---|---|---|---|
| 4,453,085 A | 6/1984 | Pryor | |
| 4,602,163 A | 7/1986 | Pryor | |
| 4,646,388 A | 3/1987 | Weder et al. | |
| 4,689,472 A | 8/1987 | Singleton et al. | |
| 4,695,736 A | 9/1987 | Doman et al. | |
| 4,704,051 A | 11/1987 | Ellingvag | |
| 4,752,012 A | 6/1988 | Juergens | |
| 4,776,521 A | 10/1988 | Weder et al. | |
| 4,788,440 A | 11/1988 | Pryor | |
| 4,816,043 A | 3/1989 | Harrison | |
| 4,852,690 A | 8/1989 | Salmi | |
| 4,893,757 A | 1/1990 | Weder et al. | |
| 5,038,975 A | 8/1991 | Weder et al. | |
| 5,233,200 A | 8/1993 | DiMarcello et al. | |
| 5,238,707 A | 8/1993 | Weder et al. | |
| 5,255,150 A | 10/1993 | Young et al. | |
| 5,336,156 A | 8/1994 | Miller et al. | |
| 5,340,608 A | 8/1994 | Weder et al. | |
| 5,741,426 A | 4/1998 | McCabe et al. | |
| 5,867,404 A | 2/1999 | Bryan | |
| 5,956,664 A | 9/1999 | Bryan | |
| 5,972,062 A | 10/1999 | Zimmermann | |
| 5,987,979 A | 11/1999 | Bryan | |
| 6,044,698 A | 4/2000 | Bryan | |
| 6,245,218 B1 | 6/2001 | Gibson et al. | |
| 6,348,146 B1 | 2/2002 | Gibson et al. | |
| 6,388,612 B1 | 5/2002 | Neher | |
| 6,392,565 B1 | 5/2002 | Brown | |
| 6,650,451 B1 | 11/2003 | Byers et al. | |
| 6,679,489 B2 | 1/2004 | Casto et al. | |
| 6,819,258 B1 | 11/2004 | Brown | |
| 6,838,998 B1 | 1/2005 | Brown et al. | |
| 6,876,099 B2 | 4/2005 | Wobben | |
| 7,124,631 B2 | 10/2006 | Wobben | |
| 7,317,260 B2 | 1/2008 | Wilson | |
| 7,337,726 B2 | 3/2008 | Wobben | |
| 7,551,130 B2 | 6/2009 | Altenschulte | |
| 7,581,360 B2 | 9/2009 | Olsen | |
| 7,621,843 B2 | 11/2009 | Madge et al. | |
| 7,755,210 B2 | 7/2010 | Kammer et al. | |
| 7,921,611 B2 | 4/2011 | Olsen | |
| 7,942,629 B2 | 5/2011 | Shi et al. | |
| 7,966,318 B2 | 6/2011 | Harshfield | |
| 7,970,500 B2 | 6/2011 | Parra Carque | |
| 8,058,740 B2 | 11/2011 | Altenschulte et al. | |
| 8,155,920 B2 | 4/2012 | Egedal | |
| 8,174,137 B2 | 5/2012 | Skaare | |
| 8,210,811 B2 | 7/2012 | Loh et al. | |
| 8,215,896 B2 | 7/2012 | Kooijman et al. | |
| 8,225,559 B2 | 7/2012 | Olsen | |
| D672,667 S | 12/2012 | Mix | |
| 8,337,706 B2 | 12/2012 | McCabe | |
| 8,366,389 B2 | 2/2013 | Hoffmann et al. | |
| 8,387,675 B1 | 3/2013 | Vaninger et al. | |
| 8,441,138 B2 | 5/2013 | Gjerlov et al. | |
| 8,489,247 B1 | 7/2013 | Engler | |
| 8,516,114 B2 | 8/2013 | Banavar et al. | |
| 8,546,967 B2 | 10/2013 | Ormel et al. | |
| 8,606,418 B1 | 12/2013 | Myers et al. | |
| 8,691,097 B2 | 4/2014 | McCabe | |
| 8,720,127 B2 | 5/2014 | Olsen | |
| 8,783,326 B1 | 7/2014 | Vaninger et al. | |
| 8,881,485 B2 | 11/2014 | Sritharan et al. | |
| 8,915,709 B2 | 12/2014 | Westergaard | |
| 8,949,420 B2 | 2/2015 | Banavar et al. | |
| 9,016,012 B1 | 4/2015 | Sritharan et al. | |
| 9,192,879 B2 | 11/2015 | McCabe | |
| 9,212,031 B2 | 12/2015 | Schneider et al. | |
| 9,290,095 B2 | 3/2016 | Roth | |
| 9,454,859 B2 | 9/2016 | Roth | |
| 9,546,499 B2 | 1/2017 | Olsen | |
| 9,567,978 B2 | 2/2017 | Marwaha et al. | |
| 9,579,655 B2 | 2/2017 | DeJohn et al. | |
| 9,587,629 B2 | 3/2017 | Desphande et al. | |
| 9,605,558 B2 | 3/2017 | Perley et al. | |
| 9,624,905 B2 | 4/2017 | Perley et al. | |
| 9,631,606 B2 | 4/2017 | Slack et al. | |
| 9,637,139 B2 | 5/2017 | Kathan et al. | |
| 9,644,606 B2 | 5/2017 | Agarwal et al. | |
| 9,644,608 B2 | 5/2017 | Blom et al. | |
| 9,702,345 B2 | 7/2017 | Guadayol Roig | |
| 9,751,790 B2 | 9/2017 | McCabe et al. | |
| 9,759,068 B2 | 9/2017 | Herrig et al. | |
| 9,777,711 B2 | 10/2017 | Rossetti | |
| 9,810,199 B2 | 11/2017 | Hammerum | |
| 9,822,762 B2 | 11/2017 | Kooijman et al. | |
| 9,863,402 B2 | 1/2018 | Perley et al. | |
| 9,879,654 B2 | 1/2018 | Peiffer et al. | |
| 9,909,569 B2 | 3/2018 | Hammerum et al. | |
| 9,909,570 B2 | 3/2018 | Klitgaard et al. | |
| 9,926,911 B2 | 3/2018 | Butterworth et al. | |
| 9,949,701 B2 | 4/2018 | Meyer et al. | |
| 10,006,443 B1 | 6/2018 | Vorobieff et al. | |
| 10,023,443 B2 | 7/2018 | Herse et al. | |
| 10,036,692 B2 | 7/2018 | Perley et al. | |
| 10,047,722 B2 | 8/2018 | Vaddi et al. | |
| 10,047,726 B2 | 8/2018 | Sakaguchi | |
| 10,087,051 B2 | 10/2018 | Assfalg et al. | |
| 10,094,135 B2 | 10/2018 | Olsen | |
| 10,155,587 B1 | 12/2018 | Tang | |
| 10,184,450 B2 | 1/2019 | Wilson et al. | |
| 10,184,456 B2 | 1/2019 | Liu et al. | |
| 10,215,157 B2 | 2/2019 | Perley et al. | |
| 10,257,592 B2 | 4/2019 | Brinker et al. | |
| 10,267,293 B2 | 4/2019 | Peiffer et al. | |
| 10,294,923 B2 | 5/2019 | Kristoffersen | |
| 10,323,192 B2 | 6/2019 | Quanci et al. | |
| 10,328,960 B2 | 6/2019 | Fifield | |
| 10,385,826 B2 | 8/2019 | Butterworth et al. | |
| 10,410,487 B2 | 9/2019 | Joseph | |
| 10,457,893 B2 | 10/2019 | Ure et al. | |
| 10,495,060 B2 | 12/2019 | Caruso et al. | |
| 10,605,232 B2 | 3/2020 | Aderhold et al. | |
| 10,634,120 B2 | 4/2020 | Landa et al. | |
| 2009/0263245 A1 | 10/2009 | Shi et al. | |
| 2010/0126115 A1 | 5/2010 | Lim et al. | |
| 2010/0133827 A1 | 6/2010 | Huang et al. | |
| 2010/0140936 A1 | 6/2010 | Benito et al. | |
| 2010/0143128 A1 | 6/2010 | McCorkendale | |
| 2010/0140940 A1 | 7/2010 | Kammer et al. | |
| 2011/0140420 A1 | 6/2011 | Loh et al. | |
| 2013/0287567 A1* | 10/2013 | Olesen | F03D 7/0288 416/1 |
| 2013/0287568 A1 | 10/2013 | Miranda | |
| 2014/0003936 A1 | 1/2014 | Agarwal et al. | |
| 2014/0219797 A1* | 8/2014 | Friedrich | F03D 13/22 416/1 |
| 2014/0241878 A1 | 8/2014 | Herrig et al. | |
| 2014/0328678 A1 | 11/2014 | Guadayol Roig | |
| 2015/0076822 A1* | 3/2015 | Creaby | F03D 7/0276 290/44 |
| 2015/0322925 A1 | 11/2015 | Klitgaard et al. | |
| 2016/0222946 A1 | 8/2016 | Krings | |
| 2016/0356266 A1 | 12/2016 | Koerber et al. | |
| 2017/0306926 A1 | 10/2017 | Deshpande et al. | |
| 2018/0187446 A1 | 7/2018 | Homsi | |
| 2018/0372886 A1 | 12/2018 | Weber et al. | |
| 2019/0203698 A1 | 7/2019 | Muller et al. | |
| 2020/0025174 A1 | 1/2020 | Landa et al. | |
| 2020/0088165 A1 | 3/2020 | Nielsen et al. | |
| 2020/0124030 A1 | 4/2020 | Egedal et al. | |

FOREIGN PATENT DOCUMENTS

| | | |
|---|---|---|
| CN | 107630794 A | 1/2018 |
| CN | 110500238 B | 6/2020 |
| DE | 102010021643 A1 | 12/2011 |
| DE | 102016117191 A1 | 3/2018 |
| EP | 2466255 A1 | 6/2012 |

(56) References Cited

FOREIGN PATENT DOCUMENTS

| EP | 2306007 B1 | 11/2013 |
| EP | 2263126 B1 | 10/2014 |
| EP | 2063110 B1 | 8/2015 |
| EP | 2599993 B1 | 4/2016 |
| WO | WO2017/174090 A1 | 10/2017 |
| WO | WO2017198481 A1 | 11/2017 |
| WO | WO2018050596 A1 | 3/2018 |
| WO | WO2020011323 A1 | 1/2020 |

OTHER PUBLICATIONS

NEO-M8P Series, u-blox, u-blox M8 High Precision GNSS Modules. https://www.u-blox.com/en/product/neo-m8p-series.

Web Page Only https://www.researchgate.net/profile/Mohd_Hafiz_Yahya/publication/261841729/figure/fig1/AS:392498989027332@1470590459207/RTK-GPS-Overview_W640.jpg.

Wikipedia, Real-Time Kinematic (Web Page Only) https://en.wikipedia.org/wiki/Real-time_kinematic.

Wohlert, Measuring Rotor Blades with Laser, Reducing Wear on Wind Turbines, WindTech International, vol. 12, No. 4, Jun. 2016, 4 Pages.

\* cited by examiner

METHOD AND SYSTEM FOR DETERMINING AND TRACKING THE TOP PIVOT POINT OF A WIND TURBINE TOWER

FIELD

The present subject matter relates generally to wind turbine towers and, more particularly, to a method to determine the pivot point of a wind turbine tower.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

As hub sizes and heights continue to increase along with size and capacity of wind turbines, the steel tower that supports the hub becomes an increasingly critical component. Conditions such as settling of the tower base, relaxation of flange components, shifting of tower segments or structural loads, operational loading, environmental loading, and other variables, can all affect the integrity and life of the tower. It is important to monitor and track the reactionary loads on the tower over time in order to manage/control operating parameters and maintenance practices to ensure the integrity and longevity of the tower. In addition, the monitoring and tracking of tower deflections is a useful tool for operational control of mechanical loads and power capture.

The top of the tower during a no-load or idle state behaves as a neutral pivot point, which is a deflection-free position of the tower top about which the nacelle (including the machine head and rotor) rotate. Over time, the loads and other conditions affecting the tower mentioned above may cause this pivot point to deflect in a fore-aft, side-to-side, or torsional manner. Long-time variations in the pivot point (which may be permanent deflections) are an indication of tower structure and/or foundation changes over time. Short-time variations in the pivot point are an indication of oscillatory motion of the tower from rotor and/or drive train loads.

It would be desirable to accurately establish a known geographic reference position for the tower top pivot point and to track changes in this position over time. This information would be useful for monitoring the integrity of the steel structure and tower foundation and for control and management of structural and operational loads that may generate sway and decrease the life of the tower and other wind turbine components. Modeling methods can be applied utilizing the deflections of the tower top pivot point to determine the fore/aft and side-to-side deflections of the tower top and the associated reactionary loads.

The present invention provides a solution for accurately determining the tower top pivot point for a wind turbine tower.

BRIEF DESCRIPTION

Aspects and advantages of the invention will be set forth in part in the following description, or may be obvious from the description, or may be learned through practice of the invention.

In one aspect, the present disclosure is directed to a method for determining a geographic location ("geo-location") of a tower top pivot point (TPP) of a wind turbine tower, the tower having a nacelle at a top thereof. The term "nacelle" is used herein to encompass the components of the machine head, the rotor, and the nacelle housing. The method includes the step of configuring at least one rover receiver of a global navigation satellite system (GNSS) at a fixed position on the nacelle. Then, a plurality of 360-degree yaw sweeps of the nacelle are conducted. The geographic location signals received by the rover receiver during the yaw seeps of the nacelle are recorded. Via a controller, which may be remotely located, the geographic location signals are converted into a circular plot representation. A radius of the circular plot is then determined, the radius corresponding to a distance between the rover receiver and the TPP. Then, based on the GNSS geo-location of the rover receiver and the length of the radius, the controller computes a geo-location of the TPP. The term "geo-location" is used herein to include coordinates on a fixed geographic grid, such as latitude and longitude coordinates of a global grid.

In a particular embodiment, the rover receiver is located atop and at a back end of the nacelle at a known (predetermined) fixed distance ("x") to a centerline axis of the nacelle, In this embodiment, a reasonable assumption is made that the geo-location of the TPP lies along the centerline axis and that a right-triangle relationship exists between distance "x", the radius, and a distance "y" of the TPP along the centerline axis. With this information, the geo-location of the TPP relative to the nacelle is easily computed.

The plurality of 360-degree yaw sweeps may include at least one yaw sweep in a positive direction and at least one yaw sweep in an opposite negative direction. Multiple sweeps can be made in both directions. Desirably, the yaw sweeps are conducted during low wind speed conditions (below wind speeds that would cause transient deflections of the tower from the wind load).

In a particular embodiment of the GNSS system, the rover receiver is in communication with a fixed base station receiver, wherein an inherent position error in the rover receiver geo-location signals is reduced by correction data transmitted to the rover receiver from the fixed base station based on known real-time kinematic (RTK) correction techniques, or other correction techniques. In this embodiment, the geo-location of the rover is determined based on its relative position to the fixed base station receiver.

In an alternate embodiment, the geo-location of the rover may be determined based on the absolute global latitude and longitude position supplied from the satellite (s) directly to the rover.

Various environmental and structural loading factors can induce a temporary or permanent distortion to the tower, and it may be desirable to account for these distortions in determining the radius of the yaw sweeps (and thus the geo-location of the TPP). For example, a tower distortion correction factor may be applied to correct for tower distortion caused by weight overhang of the rotor and the nacelle relative to a vertical axis of the tower. Another tower distortion correction factor may be applied to correct for thermal tower distortion caused by temperatures differences between exposed and shaded sides of the tower. Yet another tower distortion correction factor may be applied to correct for tower distortion from transient loads placed on the tower or nacelle, such as wind loads. A total tower distortion correction factor may be applied that accounts for weight overhang distortion, thermal distortion, and load distortion.

In a certain embodiment, it may be desirable to use two or more of the rover receivers configured on the nacelle. For example, a plurality of the rover receivers may be configured either on the same side or distributed in an arbitrary manner about a centerline axis of the nacelle. In a particular embodiment, two rover receivers are configured at opposite sides of and at a same or different distance ("x") from a centerline axis of the nacelle, wherein the geo-location signals from both of the rover receivers are used to generate the circular plot and determine the radius of the yaw sweeps. When the distance "x" is the same for each rover, the respective plots should be essentially the same. A smaller or larger distance "x" will produce a smaller or larger radius plot, respectively.

Use of multiple rover receivers also enables determination of a bearing heading of the nacelle, which can be used in yaw control of the wind turbine. For example, a geo-location of each rover receiver is determined by their respective geo-location signal. A line connecting the two rover receivers thus defines a bearing line relative to North. A fixed angle between this bearing line and the centerline axis of the nacelle is known (e.g., 90-degrees) and is added to or subtracted from to the bearing line to give the bearing heading of the centerline axis (and thus the nacelle).

Use of multiple rovers also provides an overall accuracy check on the system. A discrepancy (beyond an acceptable margin of error) between the yaw sweeps of the two rovers would indicate a malfunction in one or both rovers, movement of one or both rovers, and so forth.

Embodiments of the method may include determining the geo-location of the TPP a plurality of times over a fixed time period and determining a total displacement vector of the TPP over the time period. The displacement of the TPP over time may be indicative of various factors affecting tower distortion as well as a reference for tower deflection measurements. TPP changes resulting from tower distortion may be the result of foundation settling, seismic movement, tower shell/flange relaxation, incipient structural failure, and others. Displacements of the tower from the load imparted to the tower from rotor, machine head, and environmental effects can be accurately measured and reported based on movement of the TPP. A displacement vector reflecting TPP changes over time can be evaluated for purposes of one or more of: determination of tower integrity, tower life prediction (longevity), load management, tower maintenance, or changes in operating and maintenance procedures to reduce tower distortion. Based on the evaluation, the method may include implementing a control action for the wind turbine.

The present invention also encompasses a system for determining and tracking a geographic location of a tower top pivot point (TPP) of a wind turbine tower having a nacelle (including the machine head components and rotor) at a top thereof. The system includes at least one rover receiver of a global navigation satellite system (GNSS) configured at a fixed position on the nacelle. A controller is in communication with the rover receiver and is configured to perform the following operations: record geo-location signals received by the rover receiver during a plurality of 360-degree yaw sweeps of the nacelle; convert the geo-location signals into a circular plot and determine a radius of the circular plot, the radius being a distance between the rover receiver and the TPP; and based on a known GNSS position of the rover receiver and the radius, compute a geo-location of the TPP.

In a particular embodiment of the system, the rover receiver is located atop and at a back end of the nacelle at a known fixed distance ("x") to a centerline axis of the nacelle, wherein the controller computes the geo-location of the TPP along the centerline axis based on the radius and distance "x".

The system may include a fixed base station receiver in communication with the rover receiver, the fixed base station configured to reduce an inherent position error in the rover receiver location signals by transmitting correction data to the rover receiver based on known real-time kinematic (RTK) correction techniques.

Alternatively, the geo-location of the rover may be determined based on the absolute global latitude and longitude position supplied directly to the rover from the GLASS system satellite(s).

The system may further include two or more of the rover receivers configured on the nacelle, for example two rover receivers at opposite sides of and at a same distance from a centerline axis of the nacelle, wherein the controller uses the location signals from both of the rover receivers to generate the circular plot and determine the radius. With this embodiment, the controller may be further configured to compute a heading of the nacelle based on a bearing line defined by the geo-location of the two rover receivers and a fixed angle of the bearing line relative to the centerline axis of the nacelle.

In other embodiments, the controller may be configured to perform any combination of the steps discussed above with respect to the various method embodiments.

The invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
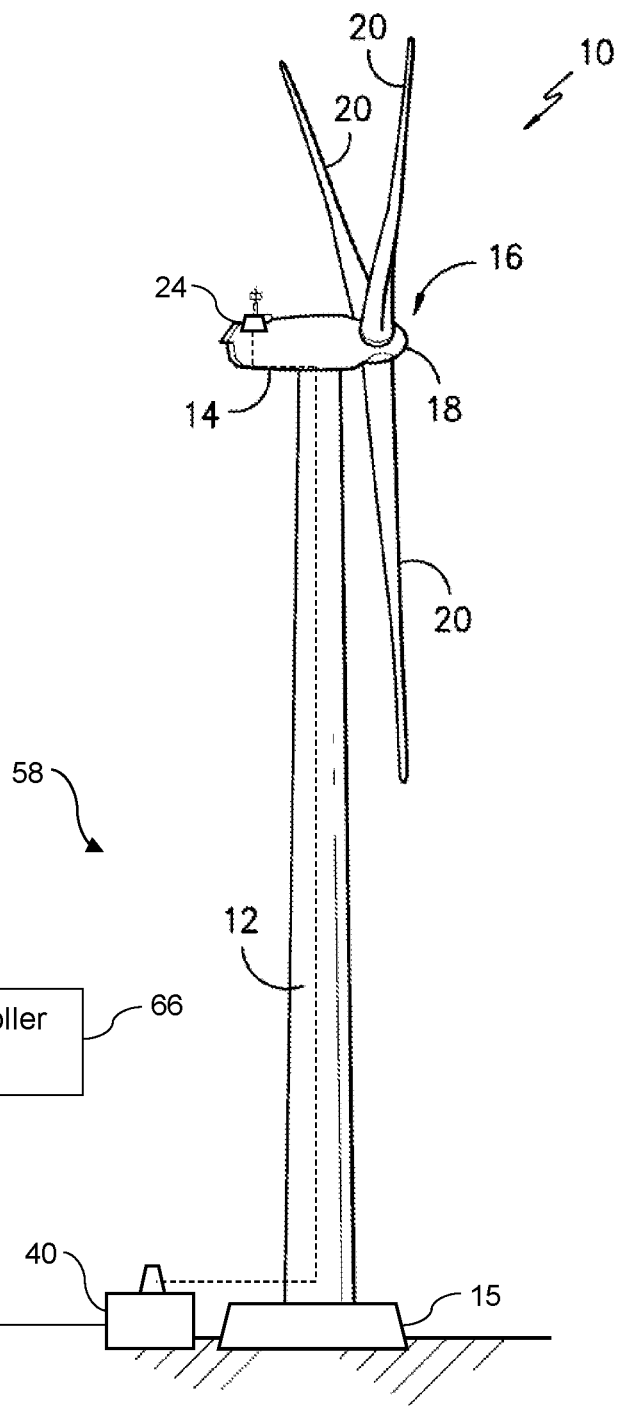
FIG. 1 illustrates a perspective view of one embodiment of a wind turbine configured with a system and method in accordance with the present invention.

Reference now will be made in detail to embodiments of the invention, one or more examples of which are illustrated in the drawings. Each example is provided by way of explanation of the invention, not limitation of the invention.

In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a method and associated system for determining and tracking a geographic location of the pivot point of a top of a wind turbine tower, wherein the pivot point is essentially a neutral deflection-free position of the tower top about which the nacelle (including the machine head and rotor) rotate. As described herein, the location and deflection of the tower top pivot point (TPP) provides valuable information for purposes of analyzing and correcting for permanent and transient distortions of the tower.

Referring now to the drawings, FIG. 1 illustrates a perspective view of one embodiment of a wind turbine 10 configured with a system 58 for practicing various methods according to the present disclosure. As shown, the wind turbine 10 generally includes a tower 12 on a base 15, a nacelle 14 mounted on the tower 12, and a rotor 16 coupled to the nacelle 14. The rotor 16 includes a rotatable hub 18 and at least one rotor blade 20 coupled to and extending outwardly from the hub 18. For example, in the illustrated embodiment, the rotor 16 includes three rotor blades 20. However, in an alternative embodiment, the rotor 16 may include more or less than three rotor blades 20. Each rotor blade 20 may be spaced about the hub 18 to facilitate rotating the rotor 16 to enable kinetic energy to be transferred from the wind into usable mechanical energy, and subsequently, electrical energy. For instance, the hub 18 may be rotationally coupled to an electric generator positioned within the nacelle 14 to permit electrical energy to be produced.

For purposes of the present disclosure, the term "nacelle" is used herein to include machine head components (e.g., drive train components, generator, etc.) located within the nacelle housing and the hub 18 components.

Figure 2:
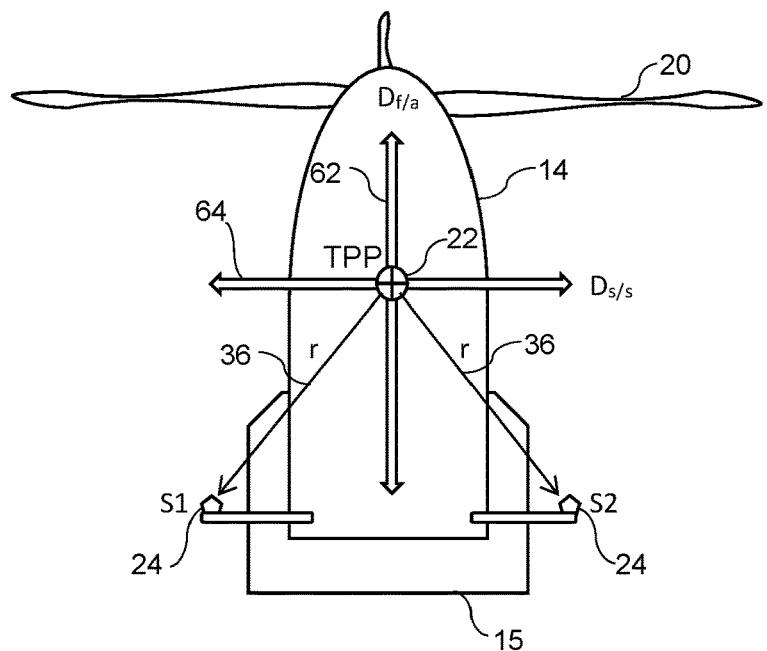
FIG. 2 is a diagram view of a nacelle configured with sensors to carry out method embodiments of the invention.

Referring to FIGS. 1 and 2, at least one rover receiver 24 of a global navigation satellite system (GNSS) is mounted at a fixed, predetermined position on the nacelle 14. The rover receiver 24 is in direct or indirect communication with a controller 66. In the depicted embodiment, the rover receiver 24 is also in communication with a fixed base station 40, as described in greater detail below. The controller 66 may be a local controller associated with a single wind turbine 10, a farm-level controller associated with a plurality of wind turbines 10 within a wind farm, or a remote controller located, for example, in a remote control/monitoring facility. The controller 66 is configured to carry out various processes, as described in greater detail below, for determining the geo-location of the TPP 22 of the wind turbine tower 12.

The GNSS system may utilize any of the available satellite-based positioning systems, such as GPS, GLONASS, Galileo, NavIC, and BeiDou. In certain embodiments, the GNSS system may also employ real-time kinematic (RTK) techniques to enhance the precision of the position data derived from the GNSS system. RTK techniques are known to those-skilled in the art. In general, the distance between a satellite navigation receiver (the rover receiver 24) and a satellite can be calculated from the time it takes for a signal to travel from the satellite to the receiver. The accuracy of the resulting range measurement is a function of the receiver's ability to accurately process signals from the satellite, as well as additional error sources such as non-mitigated ionospheric and tropospheric delays, multipath, satellite clock, and ephemeris errors, etc.

RTK techniques use the satellite signal's carrier wave as its signal. RTK uses a fixed base station 40 and the rover 24 to transmit correction data to the rover receiver 24 and reduce the rover's position error. The base station 40 rebroadcasts the phase of the carrier that it observes, and the rover 24 compares its own phase measurements with the one received from the base station. This allows the rover receiver 24 to calculate its relative position with respect to the base station 40 with a high degree of accuracy (typically within millimeters). The accuracy of the geo-location of the rover receiver 24 is thus essentially the same accuracy as the computed position of the base station 40. In essence, the base station 40 is located at a known surveyed location (a benchmark position) and the rover receiver 24 takes a fix relative to the base station 40.

As mentioned, alternatively, the geo-location of the rover may be based on the absolute global latitude and longitude position supplied directly to the rover from the GNSS satellite(s).

Figure 4:
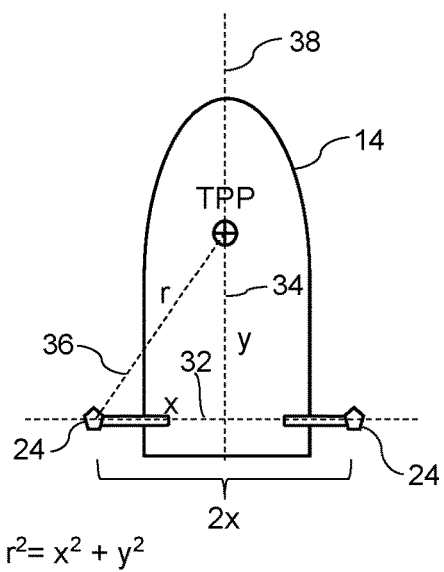
FIG. 4 is a diagram view depicting further method steps according to an embodiment of the invention.

Referring to FIGS. 2 and 4, the rover receiver 24 can be located atop and at a back end of the nacelle 14 at a predetermined fixed distance 32 ("x") to a centerline axis 38 of the nacelle. The rover receiver 24 may be mounted so as to extend outboard from the sides of the nacelle 14, as depicted in the figures. For purposes of determining the geo-location of the TPP 22 based on the GNSS geo-location of the rover receiver 24, it is reasonably assumed that the TPP 22 lies on (or within an acceptable margin from) the centerline 38 of the nacelle 14.

Figure 3:
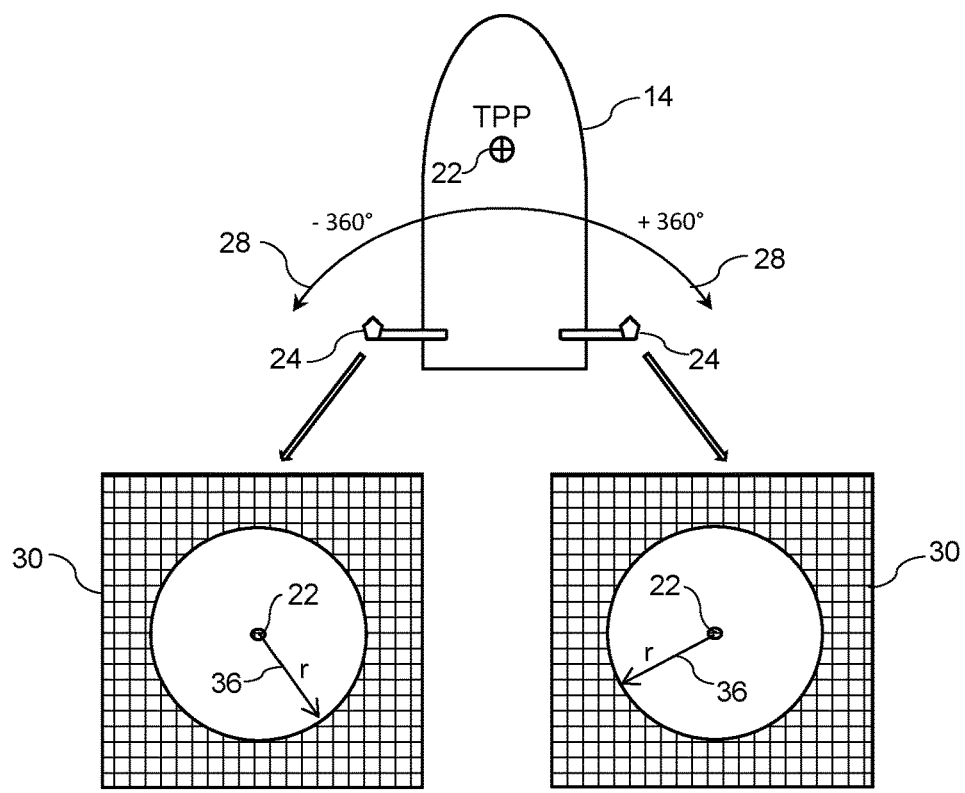
FIG. 3 is a diagram view depicting method steps according to an embodiment of the invention.

Referring to FIGS. 2 through 4, the various method embodiments include conducting a plurality of 360-degree yaw sweeps 28 of the nacelle 14 and recording the geo-location signals received by the rover receiver 24 during the yaw sweeps 28. As depicted in FIG. 3, the plurality of 360-degree yaw sweeps 28 may include one or more yaw sweeps 28 in a positive direction and one or more yaw sweeps 28 in an opposite negative direction. The 360 degree yaw sweeps should be done under low wind speed conditions.

The controller 66 converts the geo-location signals of the rover receiver 24 into a circular plot 30 and determines a radius "r" 36 of the circular plot. This radius 36 corresponds to the distance from the rover receiver 24 to the TPP 22 of the wind turbine tower 12. The controller 66 then uses the length of the radius 36 and the geo-location of the rover receiver 24 to compute a geo-location of the TPP 22. For example, referring to FIG. 4, knowing the distance "x" 32 of the rover receiver 24 from the centerline axis 38 of the nacelle 14 and with the assumption that the TPP lies on the centerline axis 38 at a distance "y" 34 from the line of "x" 32, the length of "y" 34 is readily solved using the relationship for a right-triangle: $r^2 = x^2 + y^2$. With the values of "x" and "y" determined, the precise geo-location of TPP 22 relative to the geo-location of the rover receiver 24 is then easily determined. The latitude and longitude changes (x and y) to a known geo-location of the rover receiver 24 will give the geo-location of the TPP.

Figure 6:
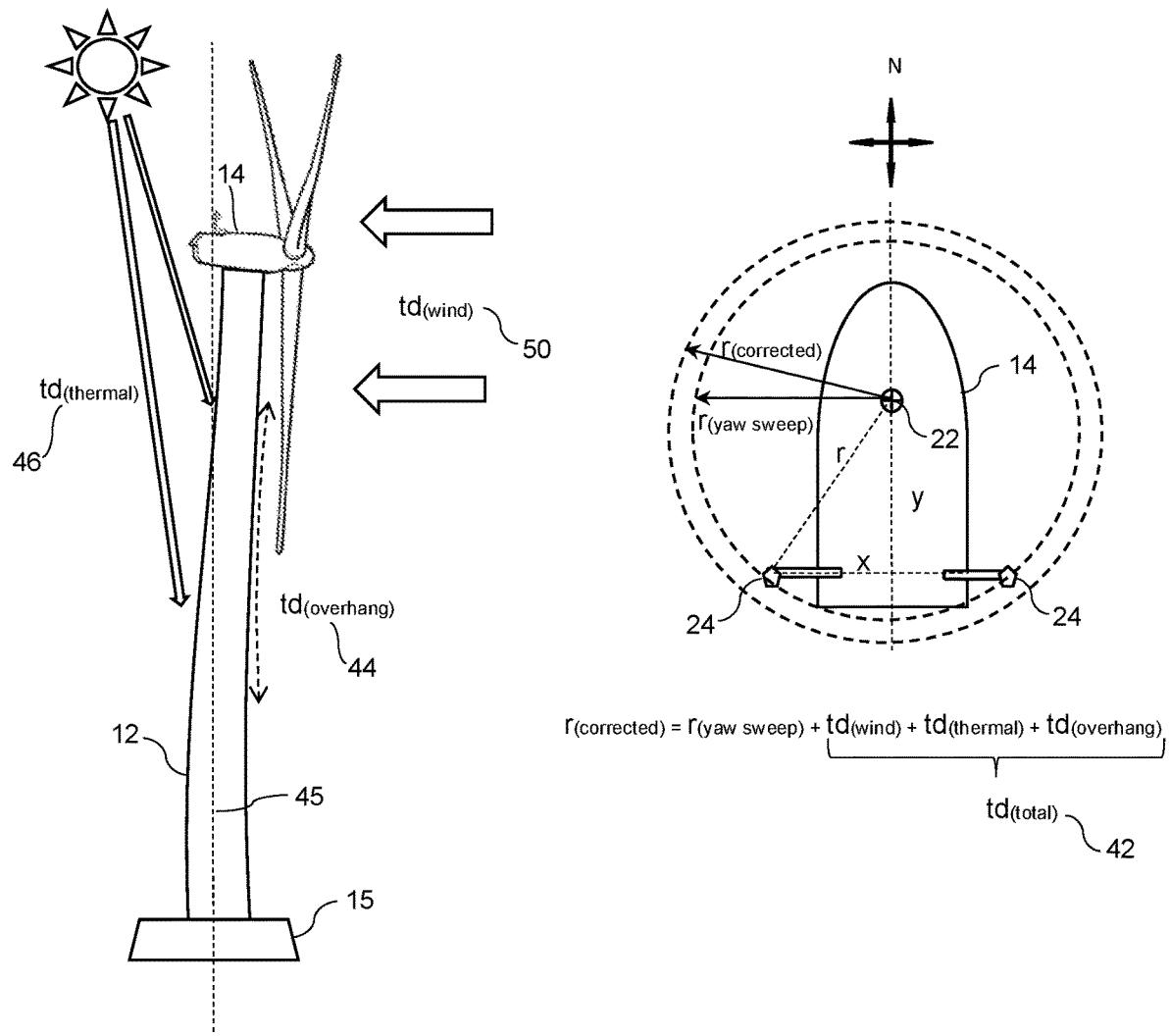
FIG. 6 is a diagram view depicting more method steps according to an embodiment of the invention.

Referring to FIG. 6, certain factors acting on the tower 12 can produce permanent or transient distortions in the tower 12 that could affect the accuracy of the initial determination of the radius 36 of the yaw sweeps 28. For example, the center of mass of the nacelle 14 (including the machine head components and the hub 18) is typically not aligned with the centerline 45 of the nacelle 14, but overhangs towards the hub 18, thus creating a moment arm on the tower 12. As the yaw sweeps 28 are conducted, the tower may continuously "lean" towards the hub 18 (indicated by the dashed arrow in FIG. 6). If this "lean" is not accounted for, the radius 36 of the yaw sweep 28 would be decreased by the amount of the "lean". The degree of the "lean" can be determined empirically or through modeling of the nacelle 14 and tower 12. An overhang tower distortion correction factor 44 (td(overhang)) can be computed and applied to the radius 36 of the yaw sweep 28 to give a corrected radius 36.

Still referring to FIG. 6, temperature differences between sides of the tower 12 can result in a thermal distortion of the tower 12. The temperature differential resulting from solar heating of one side of the tower compared to the shaded side of the tower can cause expansion of the heated side and leaning of the tower towards the shaded side. The degree of thermal distortion can be determined empirically or through modeling and used to compute a thermal tower distortion correction factor 46 ($td_{(thermal)}$) that is applied to the radius 36 of the yaw sweep 28 to give a corrected radius 36.

Still referring to FIG. 6, transient loads on the nacelle 14 caused by wind can also result in distortion of the tower 12, causing the tower to lean away from the direction of the wind. The degree of wind load distortion can be determined empirically or through modeling and used to compute a wind tower distortion correction factor 50 ($td_{(wind)}$) that is applied to the radius 36 of the yaw sweep 28 to give a corrected radius 36.

All of the distortion correction factors 44, 46, and 50 can be combined into a total distortion factor 42 that is applied to the radius 36 of the yaw sweep 28 to give a corrected radius 36.

Figure 7:
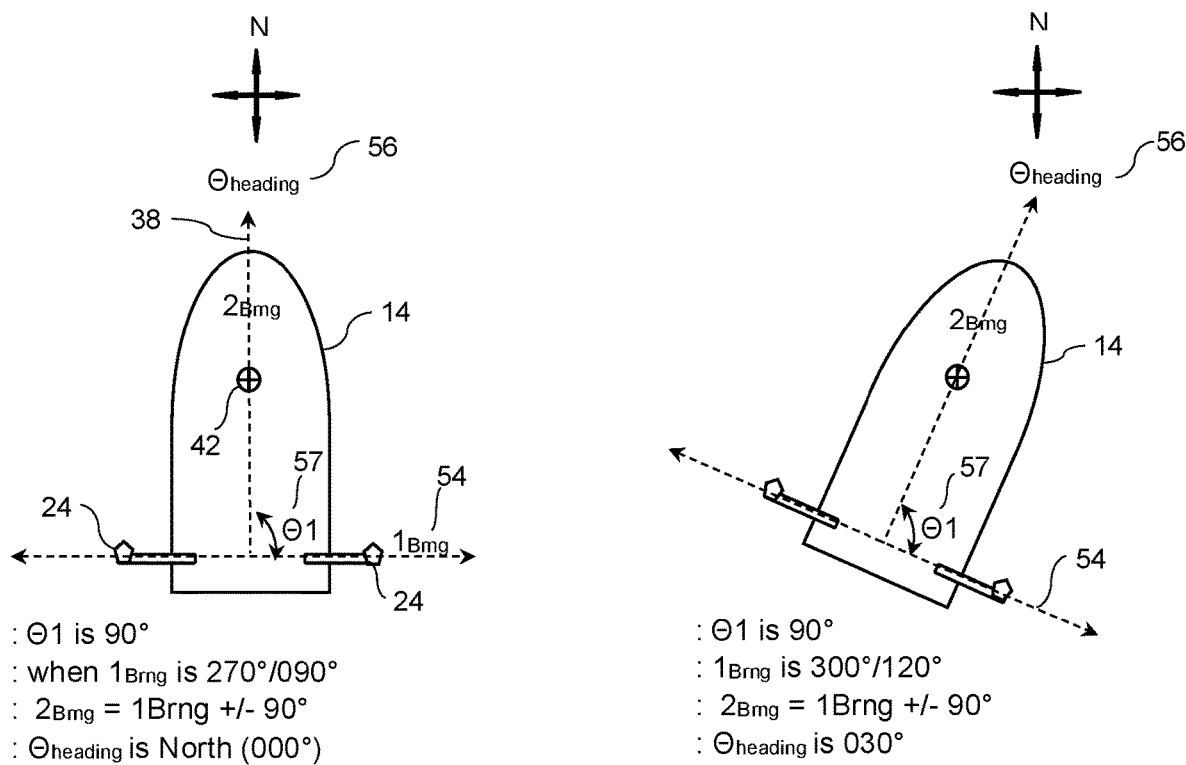
FIG. 7 is a diagram view depicting still other method steps according to an embodiment of the invention.

Referring to FIG. 2 and FIG. 7, the system and method of the present disclosure may include configuring two or more of the rover receivers 24 (S1 and S2) on the nacelle 14, for example two rover receivers 24 at opposite sides of and at a same or different distance "x" from the centerline axis 38 of the nacelle 14. The geo-location signals from both of the rover receivers 24 can be used to generate circular plots 30 and determine the radius 36 of the yaw sweeps 28 (FIG. 3). When the distance "x" is the same for each rover, the respective plots 30 should have the same radius 36. A smaller or larger distance "x" will produce a smaller or larger radius plot, respectively. The different radius plots 30 can be used to independently determine the TPP, which provides an accuracy check of the system.

The embodiment of FIG. 7 also enables computing of a heading bearing 56 of the nacelle 14. The heading bearing 56 can be used by the wind turbine control system for yaw control of the nacelle. The geo-location of the two rover receivers 24 is determined and a line through the two geo-locations provides a first bearing line 54. A fixed angle 57 (e.g., a 90-degree angle) between the bearing line 54 and the centerline axis 38 is added/subtracted to the bearing of line 54 to provide the bearing 56 of the centerline axis 38, which corresponds to the heading of the nacelle 14. For example, in the left-hand depiction of FIG. 7, the first bearing line 54 has a bearing of 270-degrees or 090-degrees and the fixed angle 57 is 90-degrees. The bearing of the centerline axis 38 corresponding to the heading of the nacelle is thus North)(000° (270-degrees+90-degrees or 090-degrees−90-degrees). The right-hand depiction is another illustration wherein the final heading 56 of the nacelle is determined the same way to be 030°.

Figure 5:
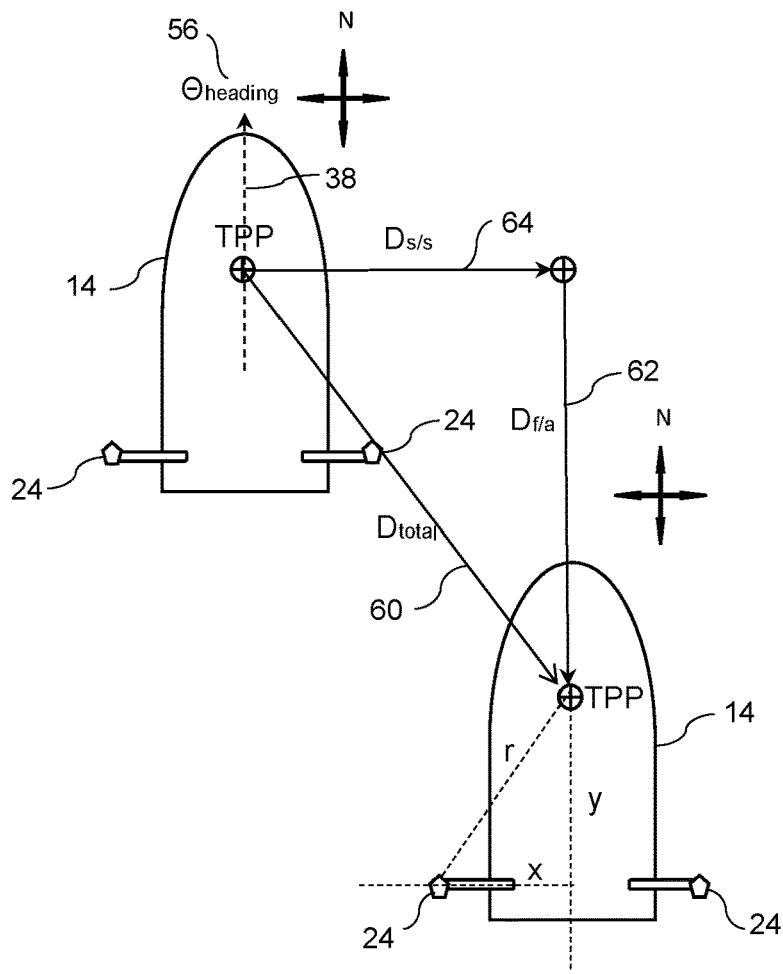
FIG. 5 is a diagram view depicting still other method steps according to an embodiment of the invention.

Referring to FIG. 5, embodiments of the present method may also include determining the geo-location of the TPP as described above a plurality of times over a fixed time period and determining a total displacement trajectory of the TPP over the time period, which may be represented by a vector. The multiple TPP's form the total displacement trajectory which can be combined into a total displacement vector 60 for the monitored time period, the total displacement vector 60 having a side-to-side component 64 and a fore-aft component 62. As mentioned above, the displacement of the TPP over time may be indicative of various factors affecting tower distortion as well as a reference for tower deflection measurements. TPP changes resulting from tower distortion may be the result of foundation settling, seismic movement, tower shell/flange relaxation, incipient structural failure, and others. Displacements of the tower from the load imparted to the tower from rotor, machine head, and environmental effects can be accurately measured and reported based on movement of the TPP. The total displacement vector 60 or displacement trajectory of TPP can be used for evaluating/ determining various tower characteristics, including determination of tower integrity, tower life prediction (longevity), load management, tower maintenance, or changes in operating and maintenance procedures to reduce tower distortion. Based on any one or more of these characteristics, the method includes implementing control actions or procedures to counter any adverse effects on the tower or overall operation of the wind turbine.

Further aspects of the invention are provided by the subject matter of the following clauses:

Clause 1. A method for determining a geographic location ("geo-location") of a tower top pivot point (TPP) of a wind turbine tower having a nacelle that includes a machine head and rotor at a top thereof, the method comprising:

configuring at least one rover receiver of a global navigation satellite system (GNSS) at a fixed position on the nacelle;

conducting a plurality of 360-degree yaw sweeps of the nacelle and recording geo-location signals received by the rover receiver during the yaw sweeps;

via a controller, converting the geo-location signals into a circular plot and determining a radius of the circular plot, the radius being a distance between the rover receiver and the TPP; and based on a GNSS geo-location of the rover receiver and the radius, computing, via the controller, a geo-location of the TPP.

Clause 2. The method according to Clause 1, wherein the rover receiver is located atop and at a back end of the nacelle at a predetermined fixed distance ("x") to a centerline axis of the nacelle, wherein the geo-location of the TPP along the centerline axis is computed based on the radius and distance "x".

Clause 3. The method according to Clause 1, wherein the plurality of 360-degree yaw sweeps comprises at least one yaw sweep in a positive direction and at least one yaw sweep in an opposite negative direction.

Clause 4. The method according to Clause 1, wherein the rover receiver is in communication with a fixed base station receiver that transmits correction data to the rover receiver, wherein the GNSS geo-location of the rover is determined relative to the base station.

Clause 5. The method according to Clause 1, wherein the GNSS geo-location of the rover is an absolute global latitude and longitude position supplied directly to the rover.

Clause 6. The method according to Clause 1, wherein the plurality of 360-degree yaw sweeps of the nacelle are conducted during low wind speeds so as to minimize transient wind loads that may cause deflection of the tower during the yaw sweeps.

Clause 7. The method according to Clause 1, wherein a tower distortion correction factor is applied to the radius from the yaw sweeps prior to determining the geo-location of the TPP.

Clause 8. The method according to Clause 7, wherein the tower distortion correction factor corrects for tower distortion caused by any one or combination of: weight overhang of the nacelle relative to a vertical axis of the tower; thermal tower distortion caused by temperatures differences between sides of the tower; or tower distortion from transient loads placed on the tower or nacelle.

Clause 9. The method according to Clause 1, wherein a plurality of the rover receivers are configured on the nacelle, the location signals from the plurality of the rover receivers used to generate the circular plot and determine the radius for each of the rover receivers.

Clause 10. The method according to Clause 9, further comprising computing a heading bearing of the nacelle based on a bearing line defined by the geo-location of the rover receivers and a fixed angle of the bearing line relative to the centerline axis of the nacelle.

Clause 11. The method according to Clause 1, further comprising determining the geo-location of the TPP a plurality of times over a fixed time period and determining a total trajectory or displacement vector of the TPP over the time period.

Clause 12. The method according to Clause 11, further comprising evaluating the total trajectory or displacement vector for purposes of one or more of: determination of tower integrity, tower life prediction, load management, tower maintenance, or changes in operating and maintenance procedures to reduce tower distortion.

Clause 13. The method according to Clause 12, further comprising implementing control action for the wind turbine based on the evaluation of the total trajectory or displacement vector.

Clause 14. A system for determining and tracking a geographic location of a tower top pivot point (TPP) of a wind turbine tower having a nacelle that includes a machine head and a rotor at a top thereof, the system comprising:
    at least one rover receiver of a global navigation satellite system (GNSS) configured at a fixed position on the nacelle;
    a controller in communication with the rover receiver, the controller configured to perform the following operations:
        record geo-location signals received by the rover receiver during a plurality of 360-degree yaw sweeps of the nacelle;
        convert the geo-location signals into a circular plot and determine a radius of the circular plot, the radius corresponding to a distance between the rover receiver and the TPP; and
        based on a GNSS geo-location of the rover receiver and the radius, compute a geo-location of the TPP.

Clause 15. The system according to Clause 14, wherein the rover receiver is located atop and at a back end of the nacelle at a predetermined fixed distance ("x") to a centerline axis of the nacelle, wherein the controller computes the geo-location of the TPP along the centerline axis based on the radius and distance "x".

Clause 16. The system according to Clause 14, further comprising a fixed base station receiver in communication with the rover receiver, the fixed base station configured to transmit correction data to the rover receiver based on real-time kinematic (RTK) correction techniques.

Clause 17. The system according to Clause 14, wherein the controller is further configured to apply a tower distortion correction factor to the radius from the yaw sweeps based on one or more of: weight overhang of the nacelle relative to a vertical axis of the tower; thermal tower distortion caused by temperatures differences between sides of the tower; and tower distortion from transient loads placed on the tower or nacelle.

Clause 18. The system according to claim 14, comprising a plurality of the rover receivers configured on the nacelle, for example at opposite sides of and at a same or a different distance from a centerline axis of the nacelle, the controller using the location signals from the plurality of rover receivers to generate the circular plot and determine the radius for each of the rover receivers.

Clause 19. The system according to claim 18, wherein the controller is further configured to compute a heading bearing of the nacelle based on a bearing line defined by the geo-location of the rover receivers and a fixed angle of the bearing line relative to the centerline axis of the nacelle.

Clause 20. The system according to Clause 14, wherein the controller is further configured to evaluate a total displacement trajectory or vector of the TPP over time and implement one or more corrective actions for the wind turbine based on the evaluation.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for determining a geographic location ("geo-location") of a tower top pivot point (TPP) of a wind turbine tower having a nacelle that includes a machine head and rotor at a top thereof, the method comprising:
    configuring at least one rover receiver of a global navigation satellite system (GNSS) at a fixed position on the nacelle;
    conducting a plurality of 360-degree yaw sweeps of the nacelle and recording geo-location signals received by the rover receiver during the yaw sweeps;
    via a controller, converting the geo-location signals into a circular plot and determining a radius of the circular plot, the radius being a distance between the rover receiver and the TPP; and
    based on a GNSS geo-location of the rover receiver and the radius, computing, via the controller, a geo-location of the TPP.

2. The method according to claim 1, wherein the rover receiver is located atop and at a back end of the nacelle at a predetermined fixed distance ("x") to a centerline axis of the nacelle, wherein the geo-location of the TPP along the centerline axis is computed based on the radius and distance "x".

3. The method according to claim 1, wherein the plurality of 360-degree yaw sweeps comprises at least one yaw sweep in a positive direction and at least one yaw sweep in an opposite negative direction.

4. The method according to claim 1, wherein the rover receiver is in communication with a fixed base station receiver that transmits correction data to the rover receiver, wherein the GNSS geo-location of the rover is determined relative to the base station.

5. The method according to claim 1, wherein the GNSS geo-location of the rover is an absolute global latitude and longitude position supplied directly to the rover.

6. The method according to claim 1, wherein the plurality of 360-degree yaw sweeps of the nacelle are conducted during low wind speeds so as to minimize transient wind loads that may cause deflection of the tower during the yaw sweeps.

7. The method according to claim 1, wherein a tower distortion correction factor is applied to the radius from the yaw sweeps prior to determining the geo-location of the TPP.

8. The method according to claim 7, wherein the tower distortion correction factor corrects for tower distortion caused by any one or combination of: weight overhang of the nacelle relative to a vertical axis of the tower; thermal tower distortion caused by temperatures differences between sides of the tower; or tower distortion from transient loads placed on the tower or nacelle.

9. The method according to claim 1, wherein a plurality of the rover receivers are configured on the nacelle, the location signals from the rover receivers used to generate the circular plot and determine the radius for each of the rover receivers.

10. The method according to claim 9, further comprising computing a heading bearing of the nacelle based on a bearing line defined by the geo-location of the rover receivers and a fixed angle of the bearing line relative to the centerline axis of the nacelle.

11. The method according to claim 1, further comprising determining the geo-location of the TPP a plurality of times over a fixed time period and determining a total trajectory or displacement vector of the TPP over the time period.

12. The method according to claim 11, further comprising evaluating the total trajectory or displacement vector for purposes of one or more of: determination of tower integrity, tower life prediction, load management, tower maintenance, or changes in operating and maintenance procedures to reduce tower distortion.

13. The method according to claim 12, further comprising implementing control action for the wind turbine based on the evaluation of the total trajectory or displacement vector.

14. A system for determining and tracking a geographic location of a tower top pivot point (TPP) of a wind turbine tower having a nacelle that includes a machine head and a rotor at a top thereof, the system comprising:
   at least one rover receiver of a global navigation satellite system (GNSS) configured at a fixed position on the nacelle;
   a controller in communication with the rover receiver, the controller configured to perform the following operations:
      record geo-location signals received by the rover receiver during a plurality of 360-degree yaw sweeps of the nacelle;
      convert the geo-location signals into a circular plot and determine a radius of the circular plot, the radius corresponding to a distance between the rover receiver and the TPP; and
      based on a GNSS geo-location of the rover receiver and the radius, compute a geo-location of the TPP.

15. The system according to claim 14, wherein the rover receiver is located atop and at a back end of the nacelle at a predetermined fixed distance ("x") to a centerline axis of the nacelle, wherein the controller computes the geo-location of the TPP along the centerline axis based on the radius and distance "x".

16. The system according to claim 14, further comprising a fixed base station receiver in communication with the rover receiver, the fixed base station configured to transmit correction data to the rover receiver based on real-time kinematic (RTK) correction techniques.

17. The system according to claim 14, wherein the controller is further configured to apply a tower distortion correction factor to the radius from the yaw sweeps based on one or more of: weight overhang of the nacelle relative to a vertical axis of the tower; thermal tower distortion caused by temperatures differences between sides of the tower; and tower distortion from transient loads placed on the tower or nacelle.

18. The system according to claim 14, comprising a plurality of the rover receivers configured on the nacelle, the controller using the location signals from both of the rover receivers to generate the circular plot and determine the radius for each of the rover receivers.

19. The system according to claim 18, wherein the controller is further configured to compute a heading bearing of the nacelle based on a bearing line defined by the geo-location of the rover receivers and a fixed angle of the bearing line relative to the centerline axis of the nacelle.

20. The system according to claim 14, wherein the controller is further configured to evaluate a total trajectory or displacement vector of the TPP over time and implement one or more corrective actions for the wind turbine based on the evaluation.

* * * * *